Feb. 18, 1930.                A. HAUCK                 1,747,239
                    PEANUT ROASTER AND CORN POPPER
                       Filed July 17, 1929        2 Sheets-Sheet 1
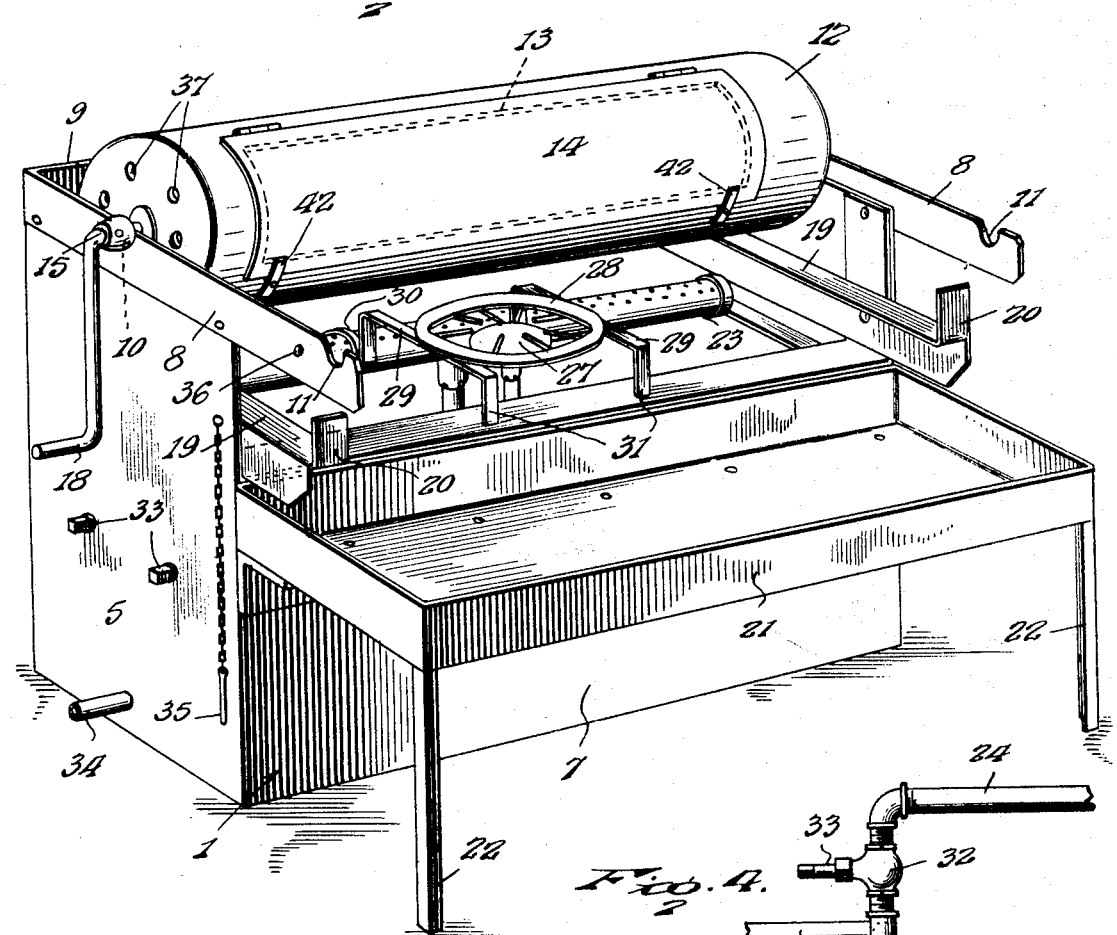
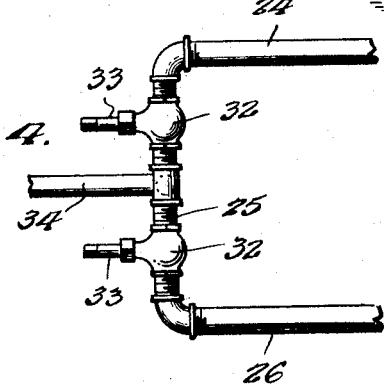
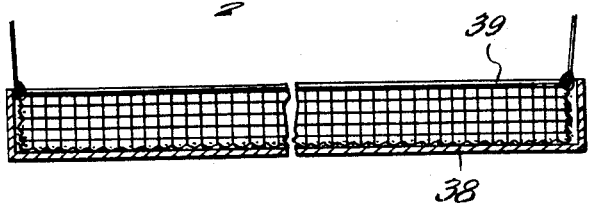
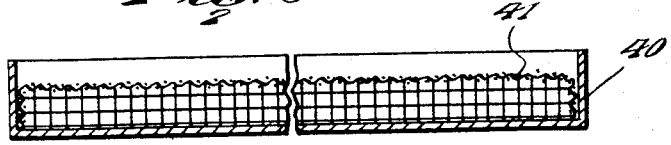
Inventor
A. Hauck.
By Lacey & Lacey, Attorneys Feb. 18, 1930.  A. HAUCK  1,747,239
PEANUT ROASTER AND CORN POPPER
Filed July 17, 1929  2 Sheets-Sheet 2
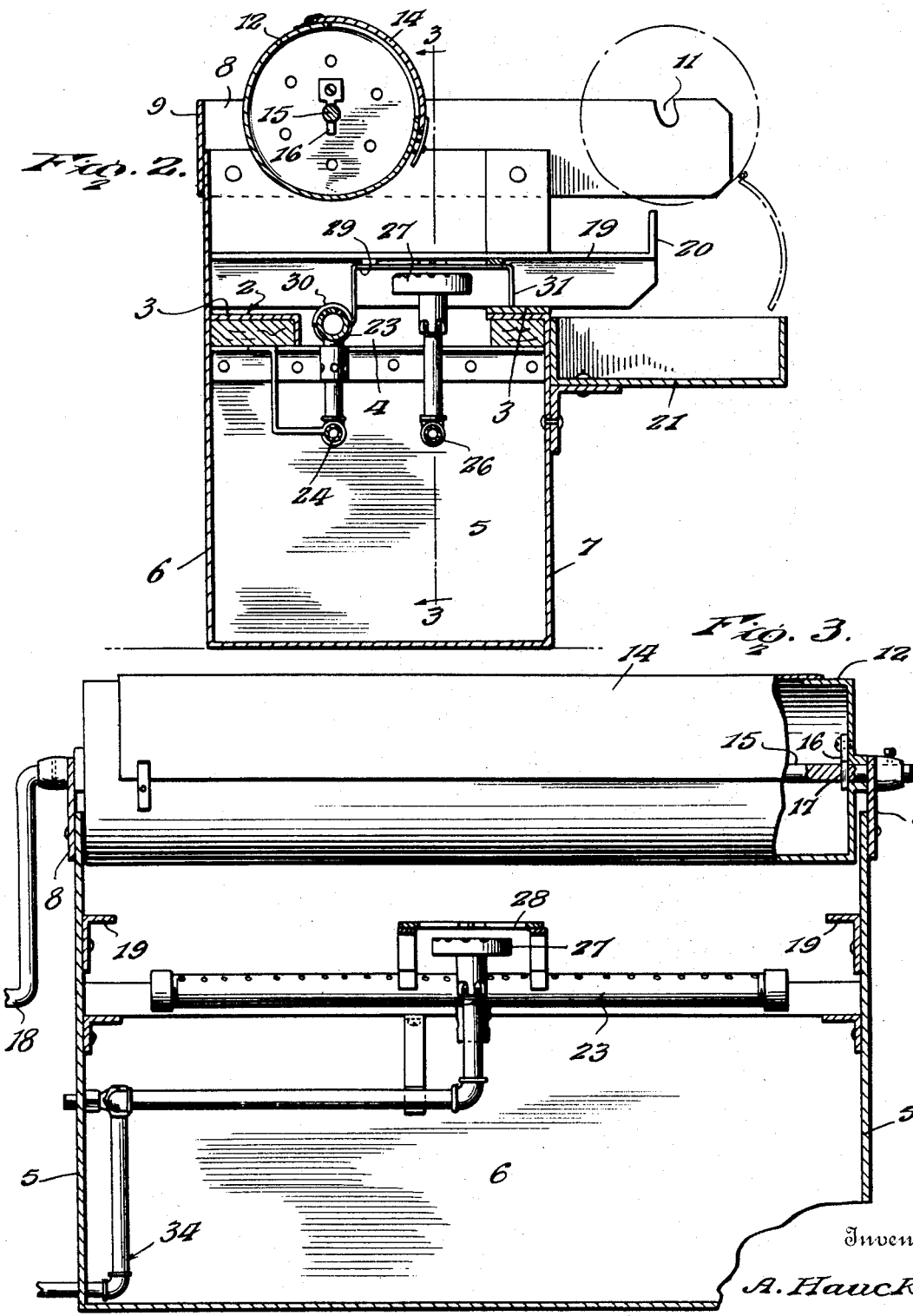

Patented Feb. 18, 1930

1,747,239

UNITED STATES PATENT OFFICE

ALBERT HAUCK, OF JEWETT, OHIO

PEANUT ROASTER AND CORN POPPER

Application filed July 17, 1929. Serial No. 379,056.

This invention is directed to improvements in peanut roasters and corn poppers.

The primary object of the invention is to provide a device of this character wherein peanuts can be properly roasted or corn popped and discharged from a drum in a convenient manner.

Another object of the invention is to provide a device of this character so constructed that potato chips and doughnuts can be cooked and peanuts salted.

Another object of the invention is to provide a device of this type wherein provision is made for cooking syrup for coating the pop corn.

With these and other objects in view, this invention resides in the novel features of construction, formation and arrangement of parts to be hereinafter more fully described, claimed and illustrated in the accompanying drawings, in which:

Figure 1 is a perspective view of the device.

Figure 2 is a transverse sectional view.

Figure 3 is a sectional view on the line 3—3 of Figure 2.

Figure 4 is a fragmentary view showing the gas manifold and its connection with the burner supply pipes.

Figure 5 is a longitudinal sectional view through one of the pans used in connection with the device.

Figure 6 is a similar view through another pan.

Referring to the drawings, 1 designates a sheet metal casing having a platform 2, said platform consisting of spaced sections 3 to provide an opening 4. The ends 5 and back 6 of the casing extend above the front wall 7 thereof.

Fixed to the end walls 5 are bars 8 which are connected by a rear bar 9, the bars 8 having formed therein bearings 10 and 11, the purpose of which will appear later.

A drum 12 is provided and is preferably formed of sheet metal and is circular in cross section, said drum having an opening 13 formed in one side thereof which is normally closed by the hingedly connected door 14. The corn to be popped or the peanuts to be roasted are introduced into the drum through the opening and discharged therefrom when the roasting or popping operation is completed.

A shaft 15 is provided and is passed through the ends of the drum, there being a pin 16 carried by one end of the drum for engaging the opening 17 formed in the shaft, said pin serving to interlock the drum and shaft so that when the crank handle 18 carried by the shaft is rotated, rotary movement will be imparted to the drum. The shaft 15 may be journaled in the bearings 10 or in the bearings 11, as the occasion requires.

Supported by the inner faces of the ends 5 are guide strips 19 having their outer ends extended beyond the front wall 7 of the casing, the extended ends having stops 20 thereon, the purpose of which will be later explained.

A pan 21 is provided and has one side secured to the front wall 7 in any approved manner and is additionally supported by the legs 22. The pan is for the purpose of receiving the popped corn or roasted peanuts discharged from the drum when the shaft 15 thereof is engaged in the bearings 11.

In order to heat the drum to pop the corn or roast the peanuts, an elongated gas burner 23 is provided and extends longitudinally of the opening, gas to said burner being furnished through the medium of the pipe 24 connected with the manifold 25. Leading from this manifold is a supply pipe 26 connected with the burner 27. The latter burner is of the circular type and cooperating therewith is a grid 28 carried by the bars 29. The inner ends of the bars 29 are formed with hooks 30 for detachably engaging the burner 23 while the other ends of said bars have downturned legs 31 adapted to rest upon the forward section 3 of the platform 2, thereby sustaining the grid above the burner 27. Valves 32 are carried by the manifold for controlling the flow of gas to the respective burners, the stems 33 of the valves being extended through one end wall of the casing for engagement with a suitable key. Gas is conducted to the manifold 25 through the pipe assembly 34 connected with the municipal supply.

It will, of course, be understood that the burner 23 is used only for heating the drum and after the corn is popped or the peanuts roasted, the shaft 15 is moved into the bearings 11, after which the drum is rotated so that the opening thereof will discharge the contents into the pan 21, there being a pin 35 for passage through an opening 36 formed in one of the bars 8 for engaging a perforation 37 formed in the drum end to hold the drum against rotation as the contents is discharged.

The grid 28 is used for supporting a pot or pan for cooking syrup for coating the popcorn when desired, and when the device is being used as a roaster or corn popper this grid may be removed and the burner 27 extinguished.

In Figure 5, I have illustrated a pan 38 in which is removably mounted a mesh basket 39. This pan is adapted to be placed upon the guide strips 19 over the burner 23 and when thus placed, potato chips or doughnuts or other articles may be cooked.

Figure 6 of the drawings illustrates another pan designated by the numeral 40 and in which is mounted a mesh frame 41, and this pan is used when it is desired to salt peanuts, it being, of course, understood that during the salting process, the pan will rest upon the guide strips 19. The stops 20 merely serve to prevent accidental withdrawal of the respective pans from the guide strips.

It will, of course, be understood that the drum is removed when the pans 38 and 40 are in use, to permit the operator to have convenient access to said pans.

Obviously, the operator, after lighting the burner 23 and placing the peanuts or corn in the drum, will slowly rotate the drum through the medium of the crank handle until the articles contained therein are properly conditioned. After the pop corn is thoroughly popped or the peanuts properly roasted, the shaft 15 is engaged in the bearings 11 in order that the contents of the drum can be conveniently discharged into the pan 21 upon opening the door 14.

The door is held in its closed position by buttons 42 which may be manipulated when hot by a suitable tool to release the door.

From the foregoing, it is thought that the operation and many advantages of the herein described invention will be apparent to those skilled in the art without further description and it will be understood that various changes in the size, shape, proportion and minor details of construction may be resorted to without departing from the spirit or sacrificing any of the advantages of the invention.

What is claimed is:

1. A device of the class described comprising a casing, bars supported by the casing and having two sets of bearings formed therein, a heating unit supported by the casing, a drum, a shaft for the drum, said shaft being adapted to engage one set of bearings to maintain the drum above the burner and to engage the other set of bearings to support the drum remote from the burner.

2. A device of the class described comprising a casing having bars supported thereby, said bars having two sets of bearings therein, a drum, a shaft for the drum, a burner supported by the casing, said shaft when engaged in one set of bearings serving to rotatably support the drum over the burner, said drum having an opening formed therein, a pan supported adjacent the casing, said shaft being adapted to engage the other set of bearings to discharge the contents of the drum through its opening into the pan.

3. A device of the class described comprising a casing, a burner supported by the casing, a second burner supported by the casing, a grid having bars carried thereby for engagement with the first named burner and the casing for maintaining the grid over the second named burner.

In testimony whereof I affix my signature.

ALBERT HAUCK. [L. S.]